(12) United States Patent
Marsilio et al.

(10) Patent No.: US 6,779,659 B2
(45) Date of Patent: Aug. 24, 2004

(54) HUB FOR HOLDING DISC-SHAPED ITEM OF RECORDED MEDIA

(75) Inventors: Ronald M. Marsilio, Canton, OH (US); Dennis D. Belden, Jr., Canton, OH (US)

(73) Assignee: Nexpak Corporation, Uniontown, OH (US)

(*) Notice: Subject to any disclaimer, the term of this patent is extended or adjusted under 35 U.S.C. 154(b) by 0 days.

(21) Appl. No.: 10/272,682

(22) Filed: Oct. 17, 2002

(65) Prior Publication Data

US 2003/0102232 A1 Jun. 5, 2003

Related U.S. Application Data

(60) Provisional application No. 60/335,293, filed on Nov. 30, 2001.

(51) Int. Cl.$^7$ ............................................... B65D 85/57
(52) U.S. Cl. ..................................... 206/308.1; 206/310
(58) Field of Search .......................... 206/308.1, 309, 206/310, 311, 312, 493

(56) References Cited

U.S. PATENT DOCUMENTS

| | | |
|---|---|---|
| 4,793,479 A | 12/1988 | Otsuka et al. |
| 5,251,750 A | 10/1993 | Gelardi et al. |
| 5,400,902 A | 3/1995 | Kaminski |
| 5,526,926 A | 6/1996 | Deja |
| 5,685,427 A | 11/1997 | Kuitems et al. |
| 5,788,068 A | 8/1998 | Fraser et al. |
| 5,829,582 A | 11/1998 | Ippolito et al. |
| 5,944,181 A | 8/1999 | Lau |
| 6,041,923 A | 3/2000 | Furutsu |
| 6,116,417 A | 9/2000 | Yoshinaga et al. |
| 6,123,192 A | 9/2000 | Rufo, Jr. |
| 6,155,417 A | 12/2000 | Flores, Jr. et al. |
| 6,164,446 A | 12/2000 | Law |
| D437,171 S | 2/2001 | Cuadrado-Serena |
| D437,520 S | 2/2001 | Choi |
| 6,186,322 B1 | 2/2001 | Dautzenberg |
| 6,196,384 B1 | 3/2001 | Belden, Jr. |
| 6,206,185 B1 | 3/2001 | Ke et al. |
| 6,206,186 B1 | 3/2001 | Cerda-Vilaplana et al. |
| 6,227,362 B1 | 5/2001 | Cheung |
| 6,237,763 B1 | 5/2001 | Lau |
| 6,241,089 B1 | 6/2001 | Grobecker |
| 6,250,461 B1 | 6/2001 | Hu |
| 6,427,833 B1 | 8/2002 | Hui |
| 6,502,694 B1 | 1/2003 | Pijanowski et al. |

FOREIGN PATENT DOCUMENTS

DE 3425579 A1 7/1984

*Primary Examiner*—Shian T. Luong
*Assistant Examiner*—E. Payton
(74) *Attorney, Agent, or Firm*—Renner, Otto, Boisselle & Sklar, LLP

(57) ABSTRACT

A hub for holding a disc-shaped item of recorded media includes a plurality of holding arms that engage the central opening of the disc-shaped item of recorded media to hold the item in a holding position. The hub also includes lifting arms that engage the inner lower edge of the disc-shaped item of recorded media to force the item upwardly with respect to the holding arms. The holding arms and lifting arms extend from opposite portions of a base member which may be in the form of a circular outer wall.

22 Claims, 4 Drawing Sheets

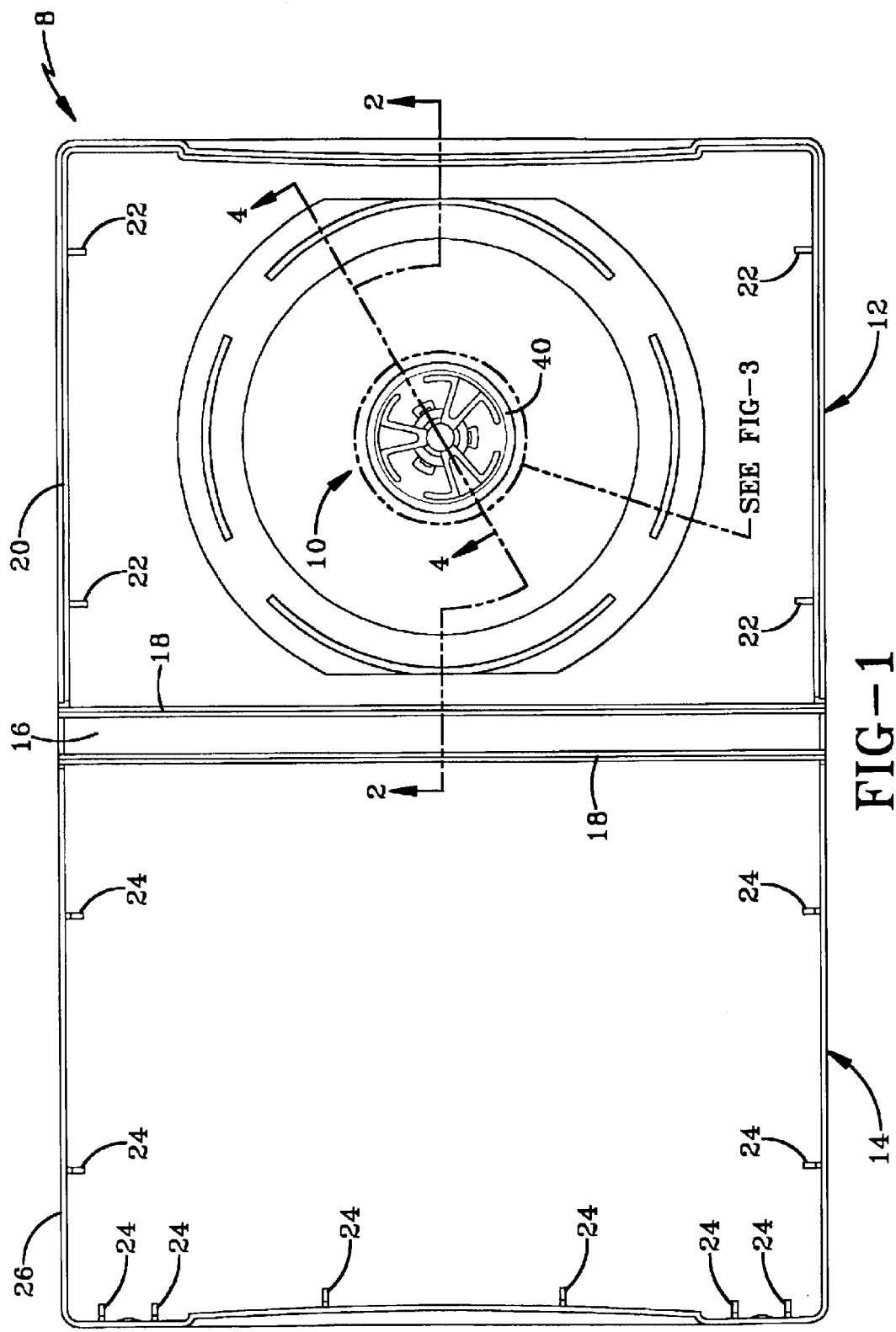

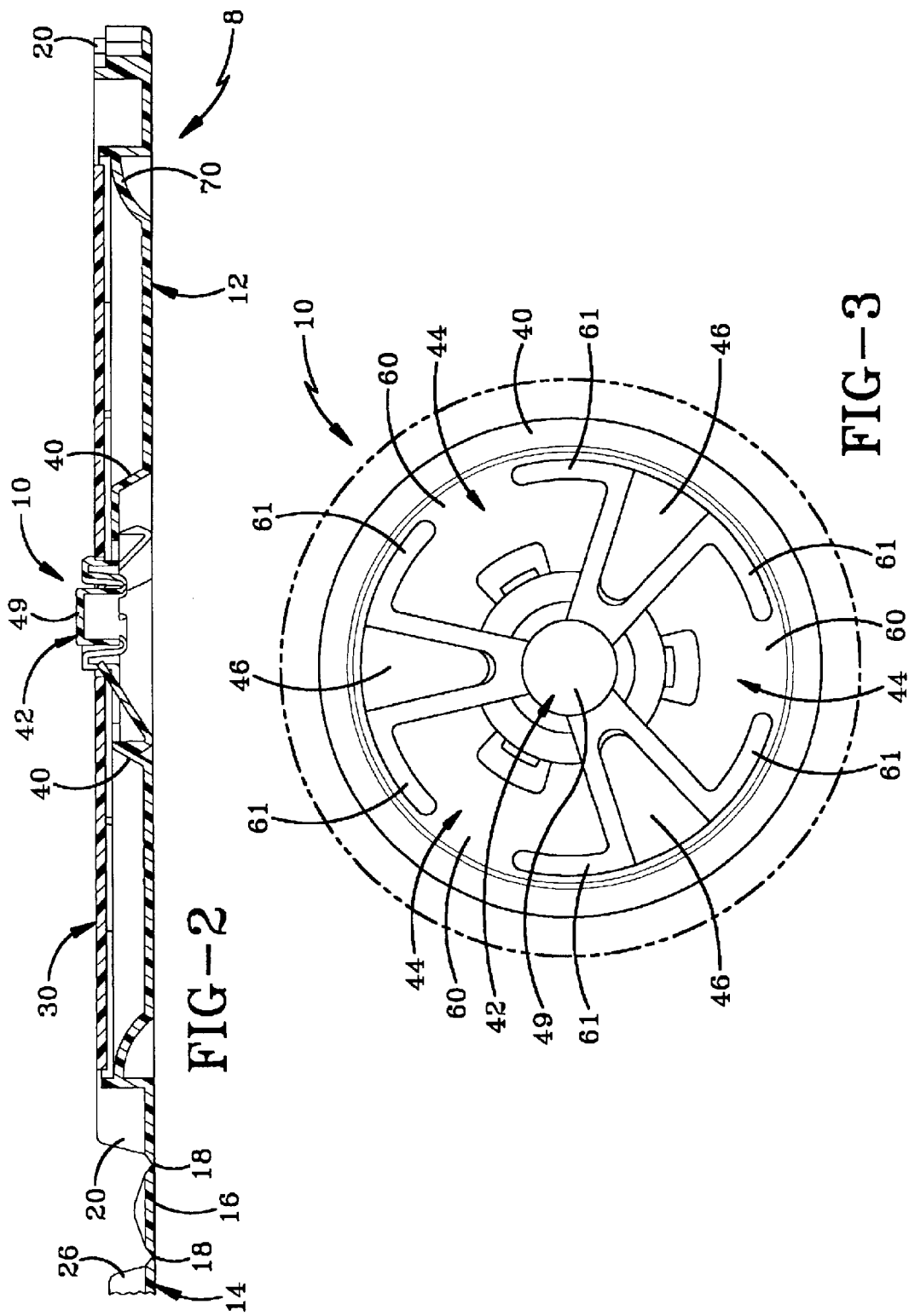

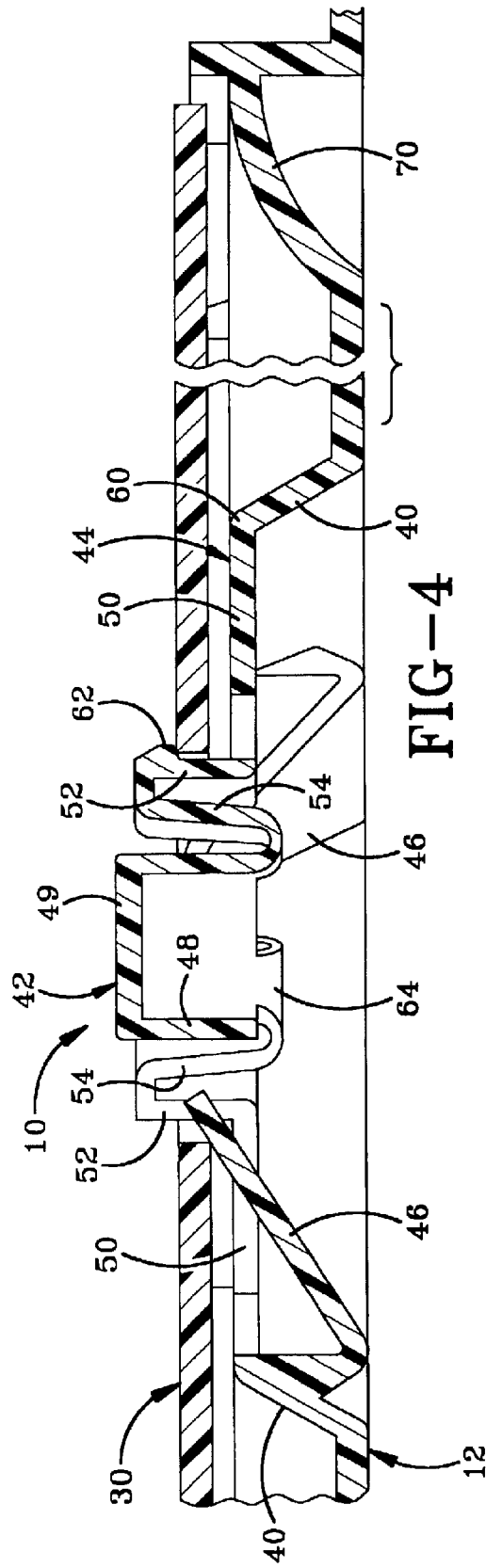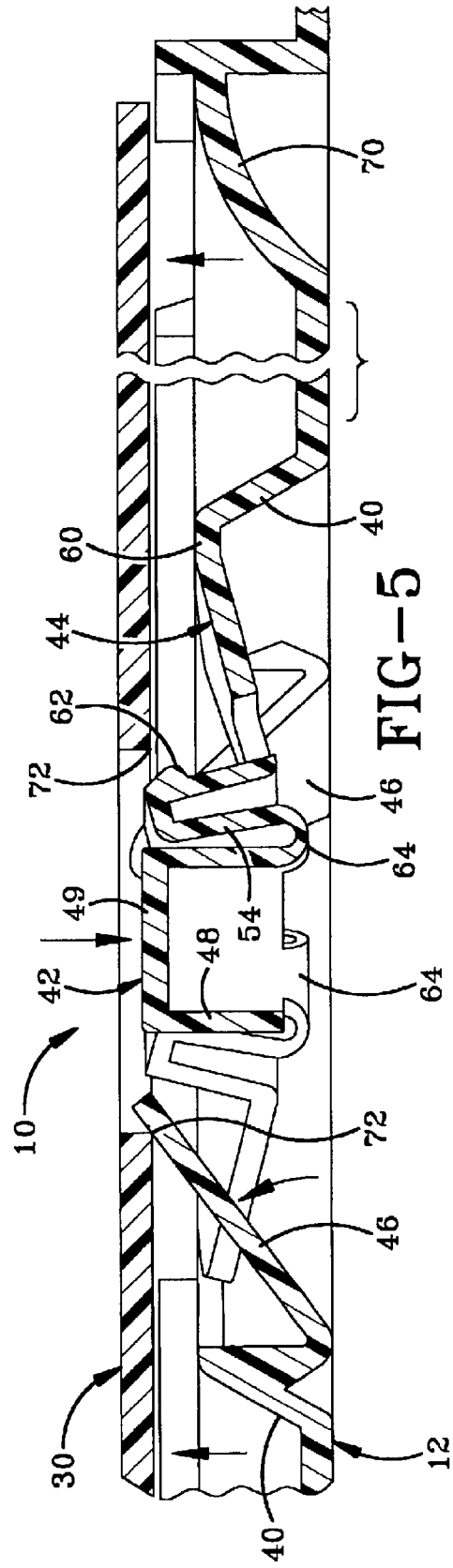

HUB FOR HOLDING DISC-SHAPED ITEM OF RECORDED MEDIA

CROSS-REFERENCE TO RELATED APPLICATIONS

This application claims priority from U.S. provisional application serial No. 60/335,293 filed Nov. 30, 2001; the disclosures of which are incorporated herein by reference.

BACKGROUND OF THE INVENTION

1. Technical Field

The present invention generally relates to media storage containers and, more particularly, to media storage containers that are configured to hold disc-shaped items of recorded media such as CDs and DVDs.

2. Background Information

Compact discs have become immensely popular in the past 15 years and have supplanted records and tapes as the dominant form of recorded music. Over this time, numerous storage containers have been developed to hold the discs during shipping, display for sale, and subsequent home storage of the discs. Most of these storage containers utilize some type of center hub that engages the center hole of the disc to hold the disc in place in the storage container.

In the recent past, DVDs have been developed that hold more data than a compact disc. Given their large storage capacity, DVDs may be used to hold feature length films as well as music. It is also contemplated that the DVDs may be used to hold data in a computer readable form. One problem with the DVD is that it currently trades durability for its increased storage space. It has been found that a DVD may be damaged by the forces that are commonly used to remove compact discs from their storage containers, to hold the compact discs in the storage containers, and to store the compact discs in the containers. Thus, a potential problem has been created in that it is believed that the vast number of consumers will treat a DVD like a CD because of the similarities in the products and will damage the DVD by doing things that do not harm a CD. It is thus desired in the art to provide a DVD storage container that prevents a consumer from damaging a DVD by improperly removing a DVD from the container.

One of the chief areas of concern with a DVD storage container is the bending forces created in the DVD by the container or removal of the DVD from the container. Although compact discs are relatively insensitive to bending stresses, DVDs are sensitive to such bending forces and may lose information or become unusable because of such bending forces. Bending forces may occur during removal of the DVD from the storage container, loading the DVD into the storage container, or storage of the DVD in the container. The industry has thus moved in a direction that requires DVD storage containers to securely retain a DVD during a drop test without creating a constant bending force on the DVD during storage or allowing a bending force to be placed on the DVD during installation or removal of the DVD from the storage container.

Although a DVD is approximately the same size, weight, and dimensions as a compact disc, the storage containers used for compact discs are generally unsuitable for providing a DVD storage container that eliminates bending forces. Most CD storage containers are unsuitable for DVDs because they include center hubs that radially and resiliently engage the center hole of a compact disc to retain the compact disc in the storage container. These constant forces may damage a DVD over time. Other compact disc storage containers allow a person to grasp the outer edge of a compact disc and pull upwardly causing the disc to disengage the center hub. This action creates a significant amount of bending force in the body of the compact disc. As compact discs are less sensitive to such bending force, this action does not substantially harm a compact disc while it may break a DVD or otherwise render it unuseable.

BRIEF SUMMARY OF THE INVENTION

The invention provides a hub that securely holds a disc-shaped item of recorded media in a storage position. The hub releases the item of recorded media when a user pushes down on the hub. The hub includes resilient lifting arms that engage the inner edge of the item of recorded media to lift the item of recorded media

BRIEF DESCRIPTION OF THE SEVERAL VIEWS OF THE DRAWINGS

FIG. 1 is a top plan view of a media storage container having the hub of the present invention.

FIG. 2 is a section view taken along line 2—2 of FIG. 1.

FIG. 3 is an enlarged top plan view of the hub.

FIG. 4 is a section view taken along line 4—4 of FIG. 1.

FIG. 5 is a view similar to FIG. 4 showing the hub being depressed to release the disc with the resilient lifting arms supporting the discs.

Similar numbers refer to similar elements throughout the specification.

DETAILED DESCRIPTION OF THE INVENTION

Figure 6:
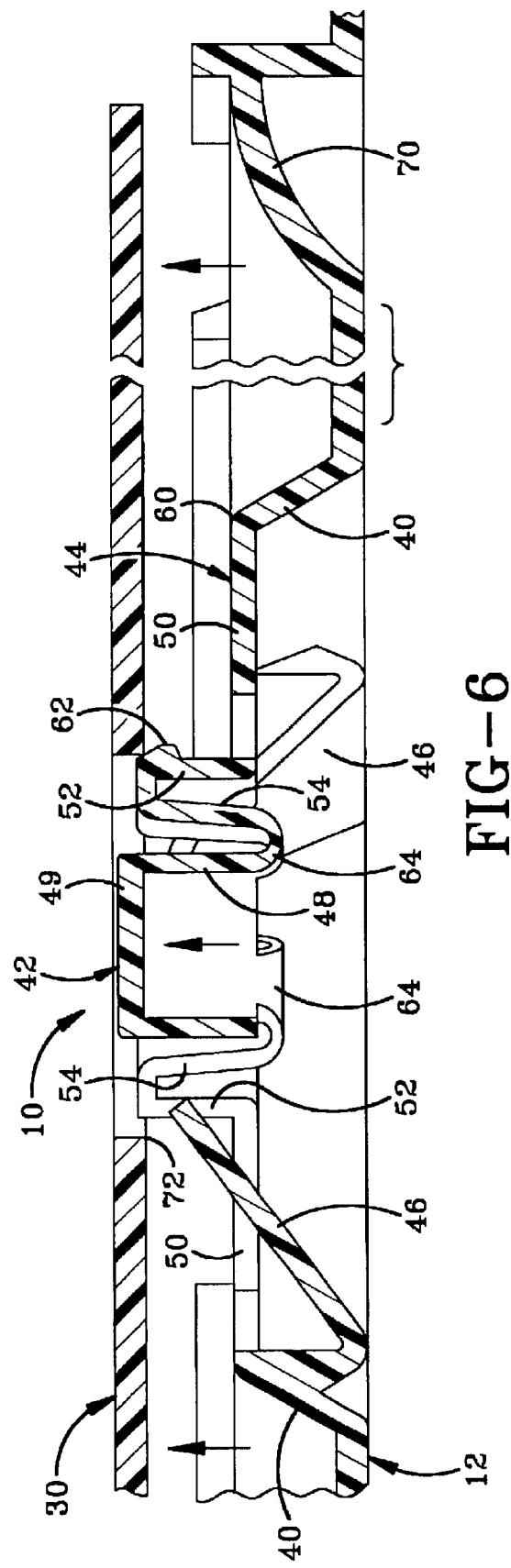
FIG. 6 is a view similar to FIG. 4 showing the hub released and lifting the disc.

A storage container 8 includes the hub 10 of the present invention. Container 8 generally includes a base, indicated generally by the numeral 12, that is hingedly attached to a lid 14. In the embodiment of the present invention depicted in the drawings, the hinged connection between base 12 and lid 14 is formed by a back wall 16 and a pair of continuous living hinges 18. Base 12 includes a sidewall 20 that extends about the three sides of base 12 not attached to living hinge 18. Sidewall 20 may include a plurality of reinforcing ribs 22 that serve to reinforce storage container 10 and may also be used to frictionally engage corresponding reinforcing ribs 24 that are carried by lid 14 and a lid sidewall 26. Container 10 may be fabricated from any of a wide variety of materials but it is preferred that it be fabricated from a plastic strong enough to resist breaking when dropped during a drop test.

Hub 10 generally includes an outer wall 40, a central button 42, and a plurality of holding arms 44 that support central button 42 from outer wall 40. Hub 10 also includes a resilient lifting arm 46 disposed between each pair of holding arms 44. In the exemplary embodiment of the invention, hub 10 includes three holding arms 44 and three resilient lifting arms 46. These elements may be integrally molded and formed integrally with the bottom wall of base 12.

Outer wall 40 may be frusto-conical in shaped such that it has a larger diameter at its lower edge than its diameter at it upper edge. Central button 42 is substantially cylindrical and includes a cylindrical sidewall 48 and a round top wall 49. Top wall 49 is connected to sidewall 48 at the upper edge of sidewall 48. Top wall 49 is disposed above the upper surfaces of arms 44 so that a user's finger or thumb will engage and depress top wall 49 before it engages arms 44.

Holding arms 44 include first 50, second 52, and third 54 arm sections. First arm section 50 is connected to the top of outer wall 40 with a first hinge 60 that allows first arm section 50 to pivot downwardly as depicted in FIG. 5. First hinge 60 may be a living hinge configured to return first arm section 50 to its resting position as shown in FIGS. 4 and 6. First hinge 60 has a width substantially less than the width of arm section 50 adjacent wall 40 as shown in FIG. 3. The smaller width is achieved by shaping arm sections 50 with slots 61 that follow the inner edge of wall 40. Second arm section 52 extends up from the inner end of first arm section 50 such that second arm section 52 is substantially vertical when first arm section 50 is in the resting position. A disc holding protrusion 62 extends outwardly from the upper end of second arm section 52. Protrusions 62 are configured to be disposed over the upper inner edge 64 of disc 30 when disc 30 is locked on hub 10. Each protrusion 62 has a gently tapered upper surface that allows disc 30 to be readily snapped down over protrusions 62. The bottom surface of each protrusion 62 is more aggressive (more perpendicular to arm section 52) so that disc 30 will be retained by the bottom surface of protrusions 62 when container 8 is dropped or turned upside down.

Each third arm section 54 is connected to the upper edge of second arm section 52 and extends downwardly and slightly radially inwardly to a lower edge that is disposed at a height (with respect to the bottom wall of base 12) less than first arm section 50. The lower edge of each third arm section 54 is connected to the lower edge of sidewall 48 with a second hinge 64. Second hinge 64 may have a wall thickness that is less than the wall thickness of sidewall 48 and third arm section 54. Hinge 64 allows second 52 and third 54 arm sections to collapse inwardly when the user pushes down on button 42.

Base 12 may define an outer support wall 70 disposed at the outer diameter of disc 30 so that the outer edge of disc 30 may not be depressed. Hub 10 is configured to support the edge of disc 30 above wall 70 when hub 10 is in the resting position as depicted in FIG. 4. Lifting arms 46 engage the inner lower edge 72 of disc 30 to hold disc 30 above arm sections 50 and outer wall 70. In the resting position, protrusions 62 push disc 30 downwardly and flex arms 46 downwardly so that arms 46 will push disc 30 upwardly when protrusions 62 are moved off of disc 30 as shown in FIG. 5. Disc 30 is thus retained by hub 30 at only the inner edges (upper and lower) of disc 30 so that the remaining portions of disc 30 are floating with respect to container 8. Disc 30 is resiliently held by arms 46 so that disc 30 does not rattle or shake itself loose from hub 10. These holding forces do not create damaging bending forces in disc 30.

When central button 42 is pushed down, protrusions 62 collapse inwardly to release disc 30. As soon as protrusions 62 move off of disc 30, arms 46 move disc 30 upwardly. When button 42 is released, protrusions move back outwardly and upwardly to lift disc 30 off of hub 10 as shown in FIG. 6. Hub 10 thus does not create large bending forces in disc 30 when disc 30 is removed from hub 10.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

What is claimed is:

1. A hub for holding a disc-shaped item of recorded media wherein the disc-shaped item of recorded media has a central opening that defines an inner lower edge of the disc-shaped item of recorded media; the hub comprising:
  a base;
  a plurality of holding arms connected to the base; each of the holding arms having a portion that passes through the central opening of the disc-shaped item of recorded media to hold the disc-shaped item of recorded media to the hub; and
  at least one lifting arm connected to the base; the lifting arm adapted to engage only the inner lower edge of the disc-shaped item of recorded media when the disc-shaped item of recorded media is held by the holding arms.

2. The hub of claim 1, further comprising a central button that is connected to each of the holding arms.

3. The hub of claim 1, wherein the lifting arm is disposed intermediate two holding arms.

4. The hub of claim 1, wherein there are three holding arms and three lifting arms; each lifting am, being disposed intermediate two holding arms.

5. The hub of claim 1, further comprising an outer wall having an upper edge and a lower end; the plurality of holding arms cantilevered from the upper edge of the outer wall; and the it least one lifting arm cantilevered from the lower end of the outer wall.

6. The hub of claim 5, wherein the outer wall is circular.

7. The hub of claim 6, further comprising a central button that is connected to each of the holding arms.

8. The hub of claim 7, wherein the at least one lifting arm is disposed between two holding arms.

9. The hub of claim 8, wherein each of the holding arms extend substantially horizontally from the outer wall.

10. The hub of claim 1, wherein the disc-shaped item of recorded media is held only by the plurality of holding arms and the at least one lifting arm when the disc-shaped item of recorded media is held to the hub.

11. A hub for holding a disc-shaped item of recorded media wherein the disc-shaped item of recorded media has a central opening that defines an inner lower edge of the disc-shaped item of recorded media; the hub comprising:
  an outer wall having an upper edge and a lower end;
  a plurality of holding arms cantilevered from the upper edge of the outer wall; each of the holding arms having a portion that passes through the central opening of the disc-shaped item of recorded media to hold the disc-shaped item of recorded media to the hub; and
  at least one lifting arm cantilevered from the lower end of the outer wall; the lifting arm adapted to engage the inner lower edge of the disc-shaped item of recorded media when the disc-shaped item of recorded media is held by the holding arms.

12. The hub of claim 11, wherein the outer wall is circular.

13. The hub of claim 11, further comprising a central button that is connected to each of the holding arms.

14. The hub of claim 11, wherein each of the lifting arms is disposed between two holding arms.

15. The hub of claim 11, wherein the lifting arm is adapted to hold the disc-shaped item of recorded media off of the holding arms when the disc-shaped item of recorded media is held by the holding arms.

16. A hub for holding a disc-shaped item of recorded media wherein the disc-shaped item of recorded media has a central opening that defines an inner lower edge of the disc-shaped item of recorded media; the hub comprising:

an outer wall having an upper edge and a lower end;

three spaced holding arms cantilevered from the upper edge of the outer wall; each of the holding arms having a portion that passes through the central opening of the disc-shaped item of recorded media to hold the disc-shaped item of recorded media to the hub;

a central button connected to each of the holding arm; the central button adapted to be disposed in the central opening of the disc-shaped item of recorded media when the disc-shaped item of recorded media is held by the holding arms;

three lifting arms cantilevered from the lower end of the outer wall; each of the lifting arms adapted to engage the inner lower edge disc-shaped item of recorded media when the disc-shaped item of recorded media is held by the holding arms to lift the disc-shaped item of recorded media off of the holding arms.

17. The hub of claim 16, wherein the outer wall is circular.

18. The hub of claim 16, wherein each of the holding arms extends substantially horizontally from the outer wall.

19. A hub for holding a disc-shaped item of recorded media wherein the disc-shaped item of recorded media has a central opening that defines an inner lower edge and an inner upper edge of the disc-shaped item of recorded media; the hub comprising:

a base;

a plurality of holding arms connected to the base; each of the holding arms having a portion that passes through the central opening of the disc-shaped item of recorded media to hold the disc-shaped item of recorded media to the hub;

each of the holding arms including a protrusion that engages the inner upper edge of the disc-shaped item of recorded media; and at least one lifting am, connected to the base; the lifting arm adapted to engage the inner lower edge of the disc-shaped item of recorded media when the disc-shaped item of recorded media is held by the holding arm; and the disc-shaped item of recorded media being held by only the engagement of the protrusions with the inner upper edge and the engagement of the at least one lifting arm with the inner lower edge of the disc-shaped item of recorded media.

20. The hub of claim 19, further comprising an outer wall having an upper edge and a lower end; the plurality of holding arms being cantilevered from the upper edge of the outer wall; and the at least one lifting arm being cantilevered from the lower end of the outer wall.

21. The hub of claim 20, further comprising a central button that is connected to each of the holding arms.

22. The hub of claim 21, wherein the at least one lifting arm is disposed between two holding arms.

* * * * *